UNITED STATES PATENT OFFICE.

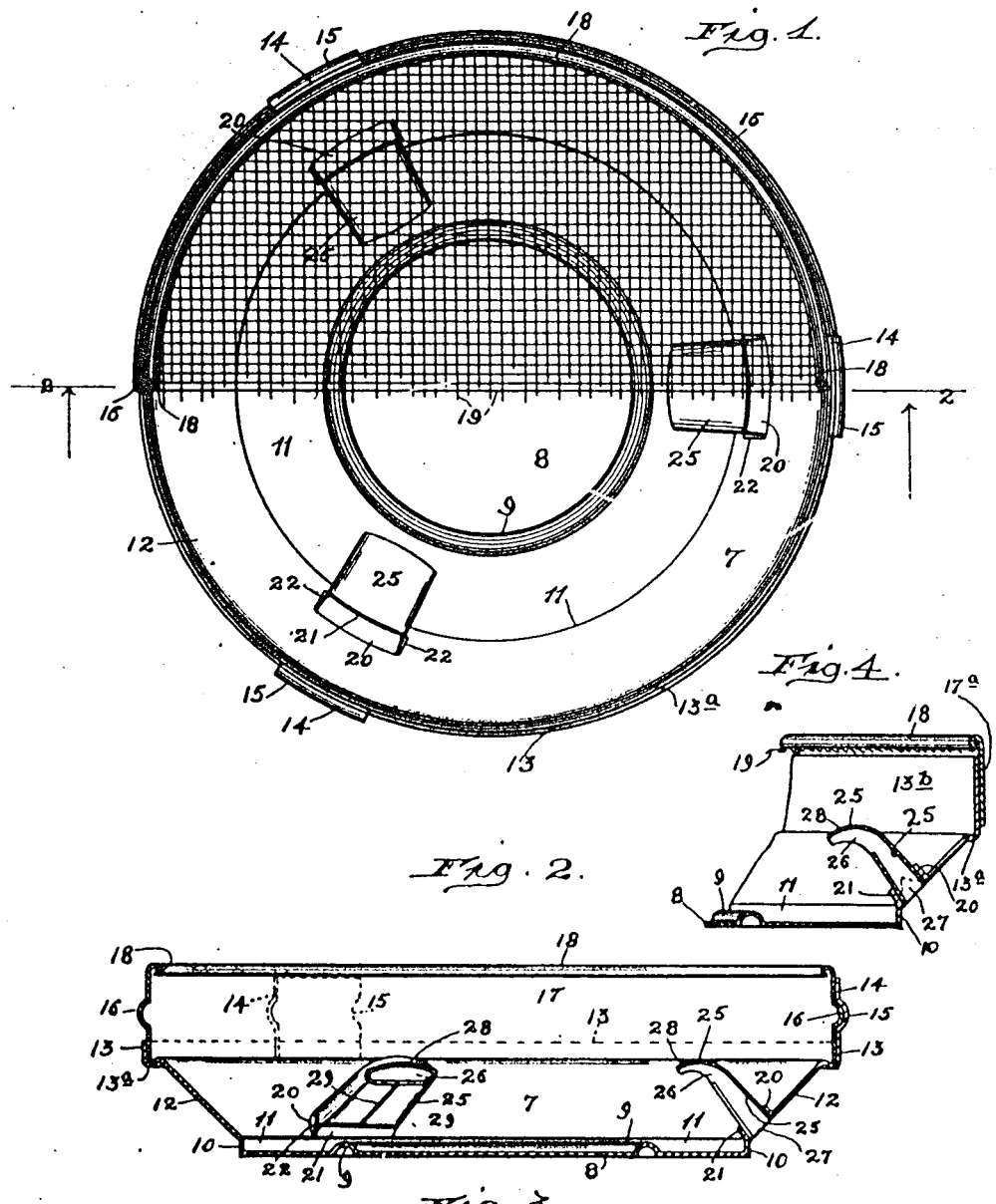

JOHN A. DAVIS, OF CHICAGO, ILLINOIS.

INSECT-TRAP.

1,057,224.   Specification of Letters Patent.   Patented Mar. 25, 1913.

Application filed September 15, 1911. Serial No. 649,446.

*To all whom it may concern:*

Be it known that I, JOHN A. DAVIS, a citizen of the United States, residing at Chicago, in the county of Cook and State of Illinois, have invented certain new and useful Improvements in Insect-Traps, of which the following is a specification.

This invention relates to certain new and useful improvements in that type of traps used for catching insects of various kinds, but is especially intended for trapping or catching roaches, water-bugs, and other insects of the bug species or family, and it consists in certain peculiarities of the construction, novel arrangement, and operation of the parts thereof, as will be hereinafter more fully set forth and specifically claimed.

The primary object of the invention is to provide an efficient trap of the above named general character which shall be simple and inexpensive in construction, strong and durable, the parts of which may be readily assembled for use or disconnected, the trap requiring no attention except to bait the same and when it becomes necessary to separate the parts of the trap to remove the insects or bugs, which have been caught therein.

Another important object is to provide a trap of such construction that it can be made at a minimum cost or expenditure, and so that said trap will be compact in form in order to require small space or packages for the storage or shipment thereof, as well as to enable the traps to be placed in out of the way places when being used for trapping the insects.

Various other objects and advantages of the invention will be disclosed in the subjoined description and explanation.

In order to enable others skilled in the art to which the invention pertains, to make and use the same I will now proceed to describe it referring to the accompanying drawing in which—

Figure 1, is a plan view of an insect trap embodying the invention, showing a portion of the upper part thereof removed. Fig. 2, is a horizontal sectional view taken on line 2—2, of Fig. 1, looking in the direction indicated by the arrows. Fig. 3, is a view of a portion of the base of the device, showing the manner of forming the holders for the trapping members, and Fig. 4, is a horizontal sectional view of a portion of the trap showing a modification in the construction of the base and cover therefor.

Like numerals of reference refer to corresponding parts throughout the different views of the drawing.

In the drawing, the reference numeral 7, designates the base of the trap, which is preferably made of sheet metal, and pressed or formed into the shape illustrated in Figs. 1, and 2, of the drawing, that is, said sheet or piece of metal is formed into an annular cup or dish shape, having a central portion 8, to rest flatly on the floor or support for the trap, which bottom portion is provided with an annular upset portion 9, which projects upwardly from the portion 8, and forms a retainer for one kind of bait for the insects. At its periphery, the portion 8, of the base is provided with an upwardly extended portion 10, which is preferably made concentric with the annulus 9, and outwardly therefrom so as to provide a trough or receptacle 11, for water, which may be deposited therein, and which is attractive to roaches and water-bugs. By this arrangement it will be understood that the receptacle formed by the annulus 9, may contain one kind of bait, which may be more or less dry and the receptacle formed between the annulus 9, and the upturned portion 10, may contain another kind of bait, for instance, liquid.

Extended from the upturned portion 10, in an outwardly and upwardly inclined direction is the main portion or body 12, of the base which preferably has at its periphery an upwardly extended flange 13, which is provided at suitable points thereon with upwardly extended clamping members 14, to engage the band of the cover of the trap. Each of the clamping members 14, is provided between its upper end and its juncture with the upturned portion 13, with a bead 15, to engage a similar bead 16, formed on the band 17, of the cover, between its upper and lower edges, as will be readily understood by reference to Fig. 2, of the drawing. The upper edge of the band 17, of the cover is provided with an inturned and downwardly extended flange 18, which is clamped on the edge or selvage of a piece of wire cloth 19, or other suitable reticulated material, which is located within the upper portion of the band 17, and forms the upper part of the cover of the trap. To form a seat for the lower edge of the band 17, of the cover, and to assist in holding it in position on the base 7, the body portion 12, of said base may be provided at its juncture with the upwardly extended flange or portion 13, with an annular groove 13ª, which by reference to Fig. 2, of the drawing, it will be seen, will embrace the lower edge of the band 17, and hold it against inward movement, while the clamping members 14, will prevent its outward and accidental upward movement.

At suitable points or places, and preferably just above the upturned portion 10, of the bottom 8, of the base of the trap, the body portion 12, of said base is provided with one or more holders which are designated as a whole, by the reference numeral 20, see Fig. 3, and each of which consists of two side pieces 21, and two end pieces 22, which are formed by making angular incisions 23, in the portion 12, of the base, and uniting said cuts at their apices by means of another incision 24, formed in said body portion of the base, which will permit the portions 21, and 22, to be extended upwardly at the desired inclinations on the inner surface of the body portion 12, of the base as is clearly shown in Fig. 2, of the drawing. Located in each of the holders 20, is a trapping member 25, each of which is preferably made of sheet metal formed into a slightly inwardly or upwardly tapered tubular member flattened in cross section.

Each of the tubular members 25, is provided near its upper end with an opening 26, to permit the bugs or insects to pass into the trap after having entered the trapping members 25, at the entrance openings 27, and passed through said members. Above its opening 26, each of the trapping members 25, is provided with an inwardly extended hood or canopy 28, which projects a considerable distance from the lower edge of the opening 26, and overhangs the lower wall of its trapping member, thus providing a baffle to prevent the bugs or insects climbing upwardly on the trapping members 25, and escaping through the openings 26, therein.

Each of the trapping members 25, is preferably made of a single piece of sheet metal, which has longitudinally disposed edges 29, which, when the piece of metal is bent to form the hollow or tubular member will be approximated, or will meet, thus permitting a slightly upwardly tapered hollow or tubular member to be formed, each of which is provided with an overhanging hood or baffle 28, above the exit opening in said member. By first inserting the smaller or upper end of the member into the holder 20, therefor, and forcing said member upwardly between the sides 21, and end pieces 22, of said holder, it is evident that the trapping member or members will be firmly held in position, and given an upward and inwardly inclined position within the base of the trap. It is further evident, that if desired the trapping members may be more securely fastened in position within the holders 20, by means of solder, or cement.

In Fig. 4, of the drawing, is shown a modification in the construction of the base and cover of the trap which consists in providing the body portion 12, at its periphery with an upwardly extended flange 13ᵇ, from which the clamping members 14, used in the other construction, are omitted, and which flange is projected upwardly at a sufficient distance to provide a firm support for the band 17ª, of the cover for the trap which band has secured in its upper portion a sheet of wire cloth 19, or other reticulated material in a similar manner to that shown in Fig. 1, and above described. In this modification, it will be understood that the bead 16, is omitted from the band 17, of the cover, and that said band is held in position on the flange 13ᵇ, by friction.

In operation, any suitable kind of bait may be placed within the compartment or receptacle formed by the annulus 9, which will prevent said bait becoming shifted to a position near enough to the inner surface of the trapping members 25, to permit the insects or bugs to climb out from said bait through the upper openings in said members. It is also evident that the receptacle 11, may be utilized as a trough for holding water, or liquid bait, and that the annulus 9, will prevent the other bait held therein from becoming saturated or moistened.

Having thus fully described my invention what I claim as new and desire to secure by Letters-Patent is—

1. An insect trap consisting of a base having a portion to rest flatly on a supporting surface and an outwardly and upwardly extended part provided with one or more openings, the said flat portion having on its upper surface an annulus concentric with the periphery of the flat portion but located at a distance therefrom, a hollow trapping member communicating at one of its ends with each of said openings and extended upwardly and inwardly therefrom and having its inner end free and disposed above the base, said trapping members terminating outwardly from said annulus and a cover fitted on the rim of the base.

2. An insect trap consisting of a base having a portion to rest flatly on a supporting surface and an outwardly and upwardly extended part provided with one or more openings, each of said openings having on the upper surface of the part in which they are formed and integrally with said part side and end pieces to form a holder, a hollow and tapered trapping member engaging at one of its ends each of said holders and extended upwardly and inwardly therefrom, and a cover fitted on the rim of the base.

3. An insect trap consisting of a base having a portion to rest flatly on a supporting surface and an outwardly and upwardly extended part provided with one or more openings, a hollow and tapered trapping member communicating at one of its ends with each of said openings and extended upwardly and inwardly therefrom, each of said trapping members having on its free end an inwardly extended hood overlying and projected beyond the uppermost opening in said member, and a cover fitted on the rim of the base.

4. An insect trap consisting of a base having a portion to rest flatly on a supporting surface and an outwardly and upwardly extended part provided with one or more openings, each of said openings having on the upper surface of the part in which they are formed and integral with said part side and end pieces to form a holder, a hollow and tapered trapping member engaging at one of its ends each of said holders and extended upwardly and inwardly therefrom, each of said trapping members having at its upper end an inwardly extended hood overlying and projected beyond the uppermost opening in said member, and a cover fitted on the rim of the base.

5. An insect trap consisting of a base having a portion to rest flatly on a supporting surface and an outwardly and upwardly extended part provided with one or more openings, the said flat portion of the base having an upwardly extended annulus spaced from the periphery of said flat portion, a hollow trapping member communicating at one of its ends with each of said openings and extended upwardly and inwardly therefrom but terminating at its free end outwardly from said annulus, and a cover fitted on the rim of the base.

6. An insect trap consisting of a base having a portion to rest flatly on a supporting surface and an outwardly and upwardly extended part provided with one or more openings, said part having integral therewith and projecting upwardly at each of the sides and ends of each of said openings an extension to form a holder, a hollow and tapered trapping member fitted at one of its ends in each of said holders and extended upwardly and inwardly therefrom, each of said trapping members having at its upper end an inwardly extended hood overlying and projected beyond the uppermost opening in said member, and a cover fitted on the rim of the base.

JOHN A. DAVIS.

Witnesses:
CHAS. C. TILLMAN,
E. NEWSTROM.

Copies of this patent may be obtained for five cents each, by addressing the "Commissioner of Patents, Washington, D. C."